United States Patent
Chen

(10) Patent No.: US 6,892,321 B2
(45) Date of Patent: May 10, 2005

(54) TRANSITION TO SWITCH NODE ADAPTER DIAGNOSTICS USING ADAPTER DEVICE DRIVER

(75) Inventor: Wen Chong Chen, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 09/907,118

(22) Filed: Jul. 17, 2001

(65) Prior Publication Data

US 2003/0018926 A1 Jan. 23, 2003

(51) Int. Cl.$^7$ .............................................. G06F 11/00
(52) U.S. Cl. ........................................ 714/25; 714/31
(58) Field of Search ................... 714/4, 25, 31, 714/49

(56) References Cited

U.S. PATENT DOCUMENTS

| | | | |
|---|---|---|---|
| 3,890,493 A | 6/1975 | Burtness et al. | 235/153 |
| 4,371,754 A | 2/1983 | De et al. | 179/18 |
| 5,408,464 A | 4/1995 | Jurkevich | 370/16 |
| 5,421,002 A | 5/1995 | Lee et al. | 395/575 |
| 5,487,149 A | 1/1996 | Sung | 395/182.08 |
| 5,572,679 A | 11/1996 | Ishizaka et al. | 395/200.12 |
| 5,740,350 A | 4/1998 | Rabins et al. | 395/182.08 |
| 5,805,614 A | 9/1998 | Norris | 371/37.02 |
| 5,848,227 A | 12/1998 | Sheu | 395/182.02 |
| 5,968,189 A | 10/1999 | Desnoyers et al. | 714/47 |
| 6,216,196 B1 * | 4/2001 | Elwell et al. | 710/240 |
| 6,601,183 B1 * | 7/2003 | Larson et al. | 714/4 |
| 6,684,343 B1 * | 1/2004 | Bouchier et al. | 714/4 |
| 6,704,883 B1 * | 3/2004 | Zhang et al. | 714/4 |
| 6,813,733 B1 * | 11/2004 | Li et al. | 714/47 |

* cited by examiner

*Primary Examiner*—Scott Baderman
*Assistant Examiner*—Anne L. Damiano
(74) *Attorney, Agent, or Firm*—Lawrence D. Cutter, Esq.; Kevin P. Radigan, Esq.; Heslin Rothenberg Farley & Mesiti, P.C.

(57) ABSTRACT

Smooth release of resources on a switch node adapter to a diagnostics program is provided without requiring rebooting of the system. The release technique includes: setting a first flag at a device driver associated with the adapter to block new open system calls from opening the device driver; broadcasting an adapter down event to instruct internet protocol (IP), fault service daemon (FSD) and application program interface (API) components of the node to release resources on the adapter; and setting a second flag at the device driver to block input/output control calls other than from the diagnostics program. When the device driver supports multiple adapters, only the adapter undergoing diagnostics is suspended, the remaining adapters remain up to components of the switch node. Upon completion of diagnostics, components remaining in open state are restarted on their communication windows at the adapter.

31 Claims, 6 Drawing Sheets

TRANSITION TO SWITCH NODE ADAPTER DIAGNOSTICS USING ADAPTER DEVICE DRIVER

TECHNICAL FIELD

This invention relates in general to a distributed computer system having a plurality of data processing nodes and one or more switch units which establish links between the plurality of processing nodes, and more particularly, to a testing technique wherein resources on a switch node adapter are smoothly released to a diagnostics program without requiring rebooting of the system.

BACKGROUND OF THE INVENTION

In certain parallel processing systems containing a plurality of data processing nodes, one or more switching units are provided for transferring data between the data processing nodes. A switch unit receives a connection request from one of a plurality of nodes and establishes a link between the data processing node which sends the connection request, and another of the plurality of data processing nodes, which is requested by the connection request. As used herein, a "switch node" means any node of the plurality of data processing nodes which is capable of connecting to such a switch unit. A switch node includes a device driver and at least one adapter.

Conventionally, during diagnostics testing of a switch node, a diagnostics program loads special microcode to test the adapter hardware. This process typically requires a device driver of the node to stop all send and receive requests and input/output controls issued other than for the diagnostics program. Open windows on the switch adapter must be closed to allow the diagnostics program to utilize and verify them. After performing the diagnostics, the switch node must then be rebooted to resume normal operations.

In view of the above, commercial advantage would be obtained in the art with a more seamless technique for releasing switch node resources to a diagnostics program from current clients and applications, particularly if without requiring subsequent rebooting of the system.

SUMMARY OF THE INVENTION

The shortcomings of the prior art are overcome and additional advantages are provided through the provision of a method of releasing a switch node adapter to a diagnostics program. The method includes: setting a first flag at a device driver associated with the adapter to block any new open system call; broadcasting an adapter down event to instruct components of the switch node to release resources on the adapter without closing those resources; and setting a second flag at the device driver to block input/output (I/O) control calls other than from the diagnostics program. If the device driver supports multiple adapters, then the other adapter(s) remain up and support communication I/O during diagnostic testing of the one adapter. Upon completion of diagnostic testing of the adapter, all blocked clients and applications of that adapter are resumed if they are still open and awaiting adapter resources.

Various method enhancements, as well as systems and computer program products corresponding to the above-summarized method and its enhancements are also described and claimed herein.

To restate, provided herein in one aspect is a technique for smoothly releasing resources on a switch node adapter to a diagnostics program. Advantageously, the technique will not result in the device driver being unconfigured, nor require rebooting of the system after testing. Thus, the process set forth will not affect the system nor applications on the system. Additionally, if the device driver supports multiple adapters, then the switch adapter diagnostics can be testing one adapter, while another adapter remains functioning.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
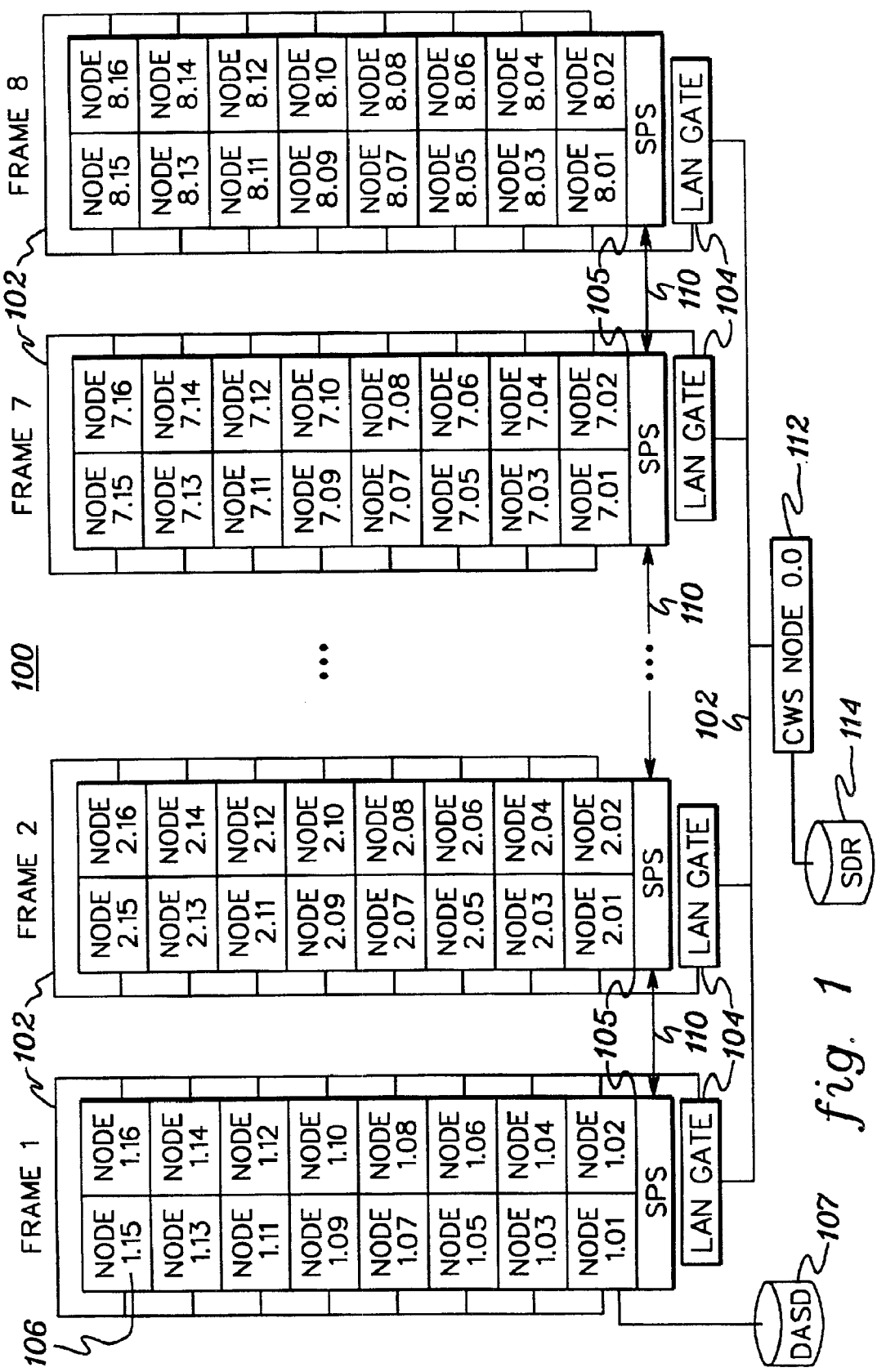
FIG. 1 depicts one example of a communications environment incorporating and using one or more aspects of the present invention.

FIG. 1 is a schematic diagram of a distributed computer system 100 incorporating and using aspects of the present invention. As one example, the distributed computer system 100 may be an IBM RISC System/6000 Scalable POWERparallel Systems (SP) distributed computer system available from International Business Machines Corporation of Armonk, N.Y. The embodiment disclosed in FIG. 1 is an SP computing environment having a total of 8 frames, with each frame having up to 16 processing nodes, for a total of 128 nodes. All of the nodes 106 are joined by a local area network (LAN) 102. Each processing node 106 is a computer itself, and may (for instance) be a RISC System/6000 computer running AIX, a UNIX based operating system well-known by those skilled in the art.

All of the nodes in a frame of the SP computer 100 are included in a LAN segment which is joined by the other LAN segments through LAN gates 104. As examples, each LAN gate 104 includes either a RISC/6000 computer, any computer network connected to the LAN or a network router. However, these are only examples. It will be apparent to those skilled in the art that there are other types of LAN gates and that other mechanisms can be used to couple the frames to one another.

Also connected to the LAN 102, is a control workstation (CWS) 112 which controls operation of the SP computer 100. The control workstation has a direct access storage device (DASD) 114 referred to as the System Shared Disk on which is stored the system data repository (SDR) files. The SDR files include such information as a list of nodes that are in the system and their configuration, and includes resources and object definitions for each of the nodes 106. Each node 106 also includes a DASD device 107 for storing data processed by the SP computer 100.

In one embodiment, the nodes in each frame are also connected to an IBM Scalable POWERparallel switch (SPS) 105. Each of the SPS switches 105 of each frame is connected to neighboring SPS switches 105 of other frames by a bus 110.

As is well understood in the art, the CWS node 112 sends system data and control signals to the frames of the SP computer 100 by means of the LAN 102, while messages and data may be sent from one to another of the nodes 106 by means of the high performance switches 105.

The distributed computing environment of FIG. 1 is only one example. It is possible to have more or less than 8 frames, or more or less than 16 nodes per frame. Further, the processing nodes do not have to be RISC/6000 computers running AIX. Some or all of the processing nodes can include different types of computers and/or different operating systems. Further, aspects of the invention are usable with other types of communications environments. All of these variations are considered a part of the claimed invention.

Figure 2:
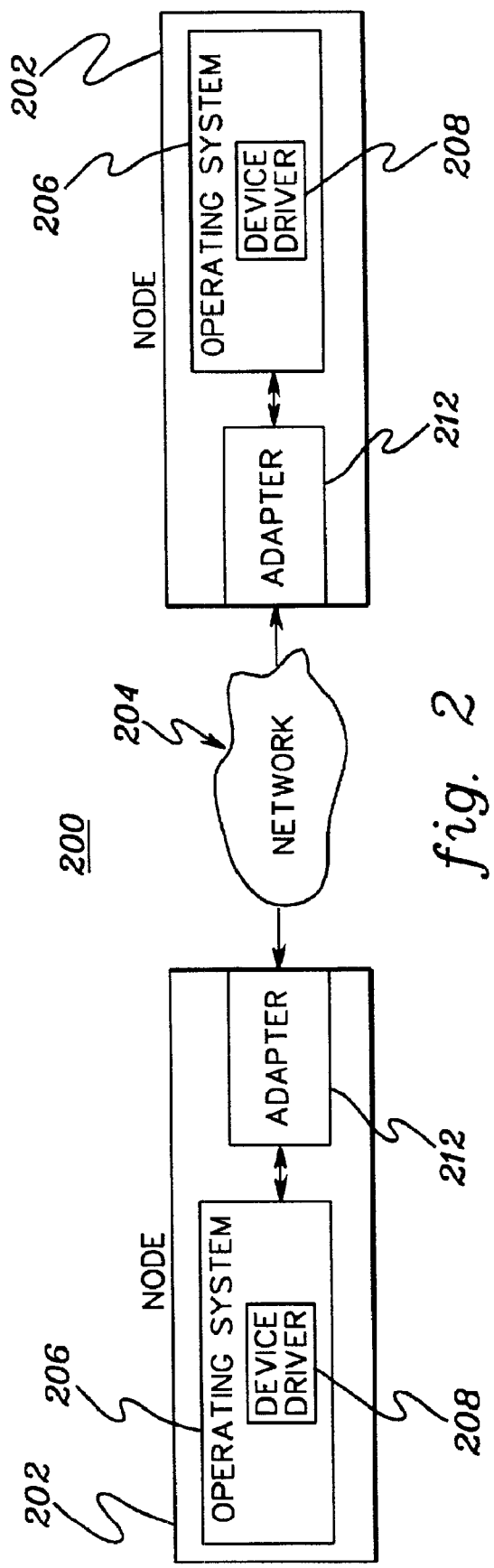
FIG. 2 depicts further details regarding a plurality of nodes of the communications environment of FIG. 1 incorporating and using one or more aspects of the present invention.

FIG. 2 depicts a more detailed embodiment of several nodes of a computing environment such as depicted in FIG. 1 incorporating and using aspects of the present invention. Environment 200 includes, for instance, a plurality of nodes 202 coupled to one another via one or more networks 204. Although two nodes and one network are illustrated, it is well known that a computing environment can include many nodes and networks such as described above in connection with FIG. 1. Further, a particular node can be coupled to one or more other nodes via one network type, and further coupled to one or more other nodes via another network type, etc.

A node 202 includes an operating system 206, such as AIX. Operating system 206 includes, for instance, at least one communication device driver 208. The device driver is based on the type of adapter in the environment, such as SP switch-2, and it may manage one or more adapters 212.

Each network adapter is used to couple its associated node to a particular network, which corresponds to that adapter type. Network 204 includes any IP capable network, such as the Ethernet, Token Ring, FDDI, ATM, SP Switch, Fiber Channel, etc.

More particular to the present invention, a goal of the processing technique presented herein is to smoothly release the SP switch resources to the diagnostics program from current clients and applications, without subsequently requiring rebooting of the system and device driver configuration. The concepts presented herein can be implemented in software as additional intelligent control at the device driver. The adapter device driver blocks (i.e., makes dormant) the current clients and applications until the diagnostics program is complete. After that point, the device driver resumes all the blocked clients and applications if they are still open and awaiting resources. This depends on how long the applications will keep retrying, and whether the client can stay in an open state and wait for a start event. The adapter and device driver continue to function at all times without reconfiguration. If there are two adapters on the device driver, such as the case with an SP switch-2 double/double configuration, network input/output may proceed on the second adapter while the first undergoes diagnostic testing.

Figure 3:
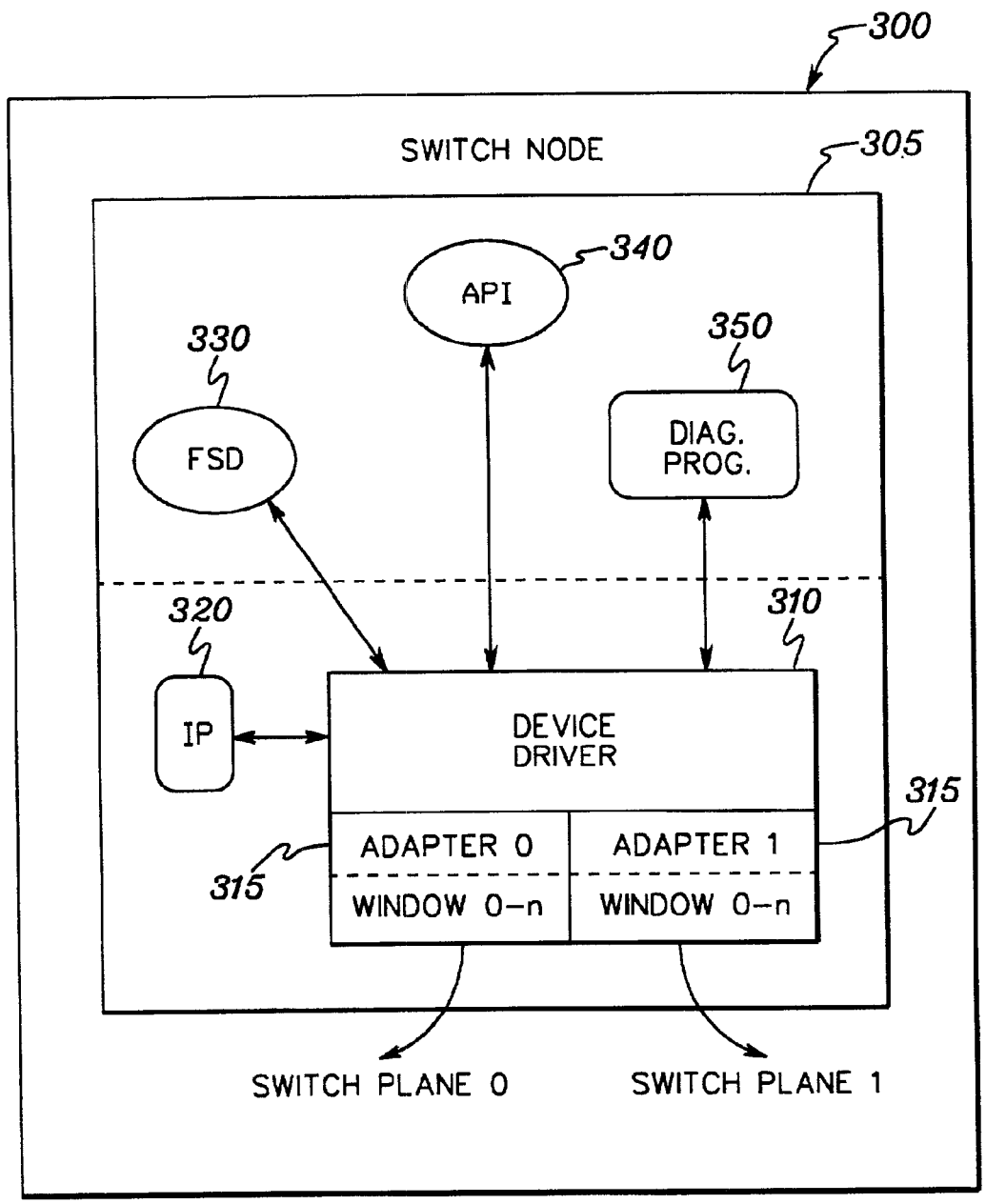
FIG. 3 depicts one embodiment of a switch node having a device driver and multiple switch adapters to undergo diagnostic testing in accordance with an aspect of the present invention.

FIG. 3 depicts one embodiment of a switch node incorporating and using aspects of the present invention. As one detailed example, switch node 300 is discussed herein to comprise an SP node, however, those skilled in the art will recognize that the concepts disclosed are applicable to other types of switch nodes, and that the claims presented should not be read as limited to an SP node or an SP switch adapter per se.

As noted above, an SP switch adapter diagnostics program loads special microcode to test adapter hardware. To accomplish this, the switch device driver must stop all send and receive requests and ioctls issued other than those from the diagnostics program. For example, no more IP packets could be sent nor received on the SP switch adapter until diagnostics testing is complete. Windows (i.e., partitions) on the SP switch adapter must be closed to allow the diagnostics program to utilize and verify them.

The problem with this approach is that the SP switch control program RC.SWITCH is always run at the boot INIT time. IP and SP switch fault service daemon (FSD) are configured and windows are opened and started. A system administrator must then manually create a dummy RC.SWITCH file not to configure IP and FSD, but to reboot the SP node to close all the windows (partitions) on the SP switch adapter to allow for diagnostics testing. Furthermore, if there are two SP adapters on a given node, then both must be closed, i.e., neither can be used for communications when the diagnostics program is testing one of the adapters.

As noted, presented herein is an online SP switch adapter diagnostic support technique which operates from the adapter's device driver and which will not unconfigure the device and reboot the system to accomplish diagnostic testing of the adapter. Further, if the SP switch adapter diagnostics is testing one adapter in a multiadapter environment, the other adapter(s) is still functional.

Continuing with FIG. 3, one embodiment of a switch node 300 is shown at which operating system 305 resides. The operating system 305 includes various system components, including a device driver 310 and two adapters 315. Device driver 310 and adapters 315 allow internet protocol (IP) 320, fault service daemon (FSD) 330 and application program interfaces (APIs) 340 components to communicate via a switching network (not shown) with other nodes in a distributed processing system such as described above. Each adapter 315 (i.e., adapter 0, adapter 1) allows components 320, 330 & 340 to access a different switch plane (e.g., switch plane 0, switch plane 1). Components 320, 330 & 340 open windows at the different adapters which allow communication via the switching network with other nodes in the system. These windows in FIG. 3 are labeled 0-n, where the number of windows n is system dependent. One example of a switch node 300 would be an SP node such as described above in connection with FIGS. 1 & 2. Further, the device driver 310 could comprise an SP_Switch2 device driver marketed by International Business Machines Corporation of Armonk, N.Y. Switch adapter 315 testing is accomplished by use of a diagnostics program 350.

In accordance with an aspect of the present invention, intelligence is added to device driver 310 to accomplish a smooth release of control of adapter 315 to the diagnostics program. This includes setting a first flag at the device driver associated with the adapter to block any new open system call, and broadcasting an adapter down event from the device driver to other components of the node to instruct those components to release resources on the adapter. These resources would comprise windows as shown in FIG. 3. A second flag is then set by the device driver to block input/output control calls other than from the diagnostics program itself.

Figure 4:
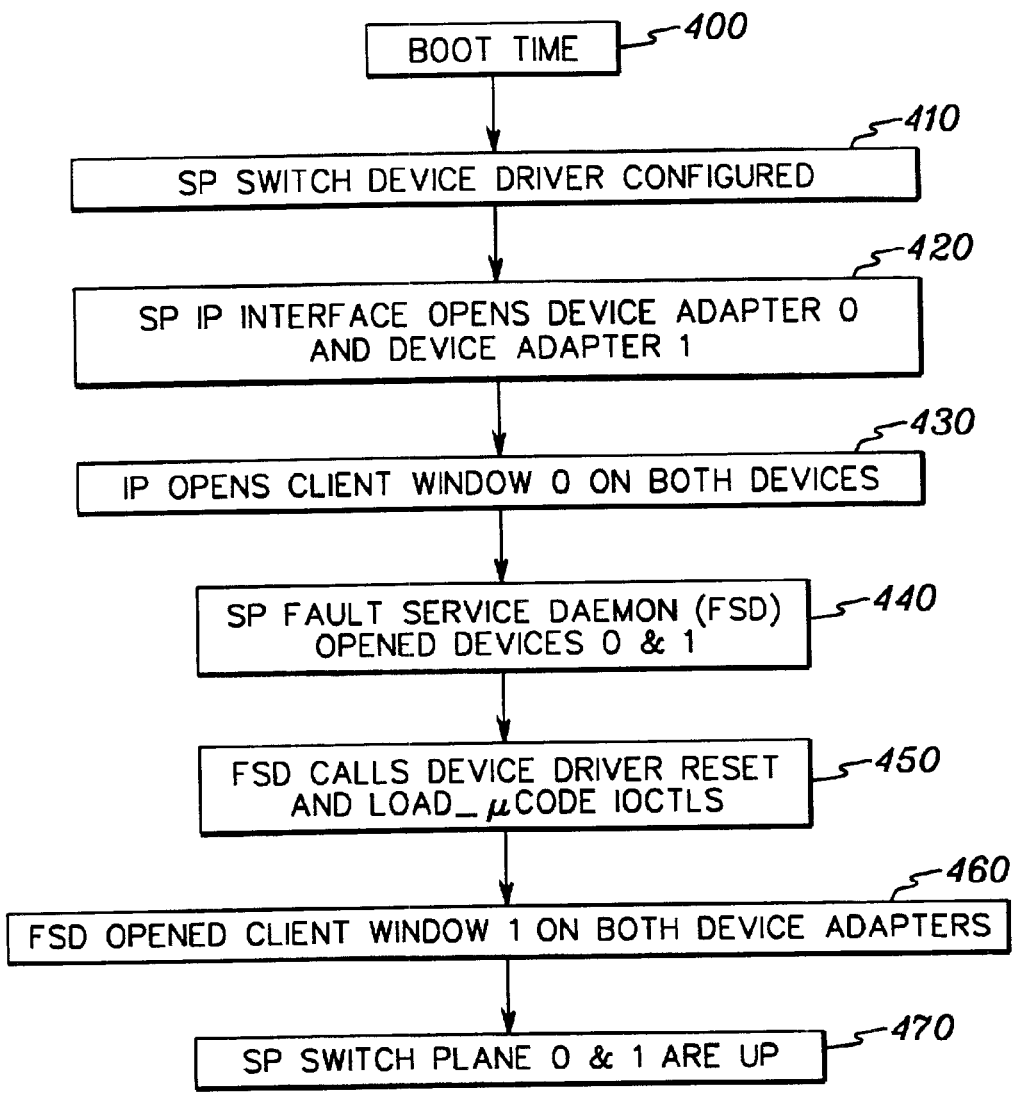
FIG. 4 is a flowchart of one embodiment of processing implemented by the switch node of FIG. 3 at boot time.

FIG. 4 depicts a flowchart of one embodiment of processing performed by switch node 300 at operating system boot time 400. In this example, the SP switch device driver, such as an SP switch_2 device driver is configured 410, after which the SP IP interface opens adapter devices 0 & 1 420. The IP opens a client window 0 on both device adapters 430, and an SP fault service daemon (FSD) also opens device adapter 0 & 1 440. The FSD component then calls the device driver to reset and load input/output control microcode (load_µcode ioctls) 450. The FSD opens client window 1 on both adapter devices 460, after which two SP switch planes 0 & 1 are up and functional 470. Each component 320, 330 & 340 (see FIG. 3) uses at least one port or window in adapter 0 and in adapter 1.

After boot time, the API component opens the device driver, and opens client windows on either or both device adapters based on the client type in the user space program. Alternatively, the API component can accomplish input/output via the SP IP interface.

Figure 5:
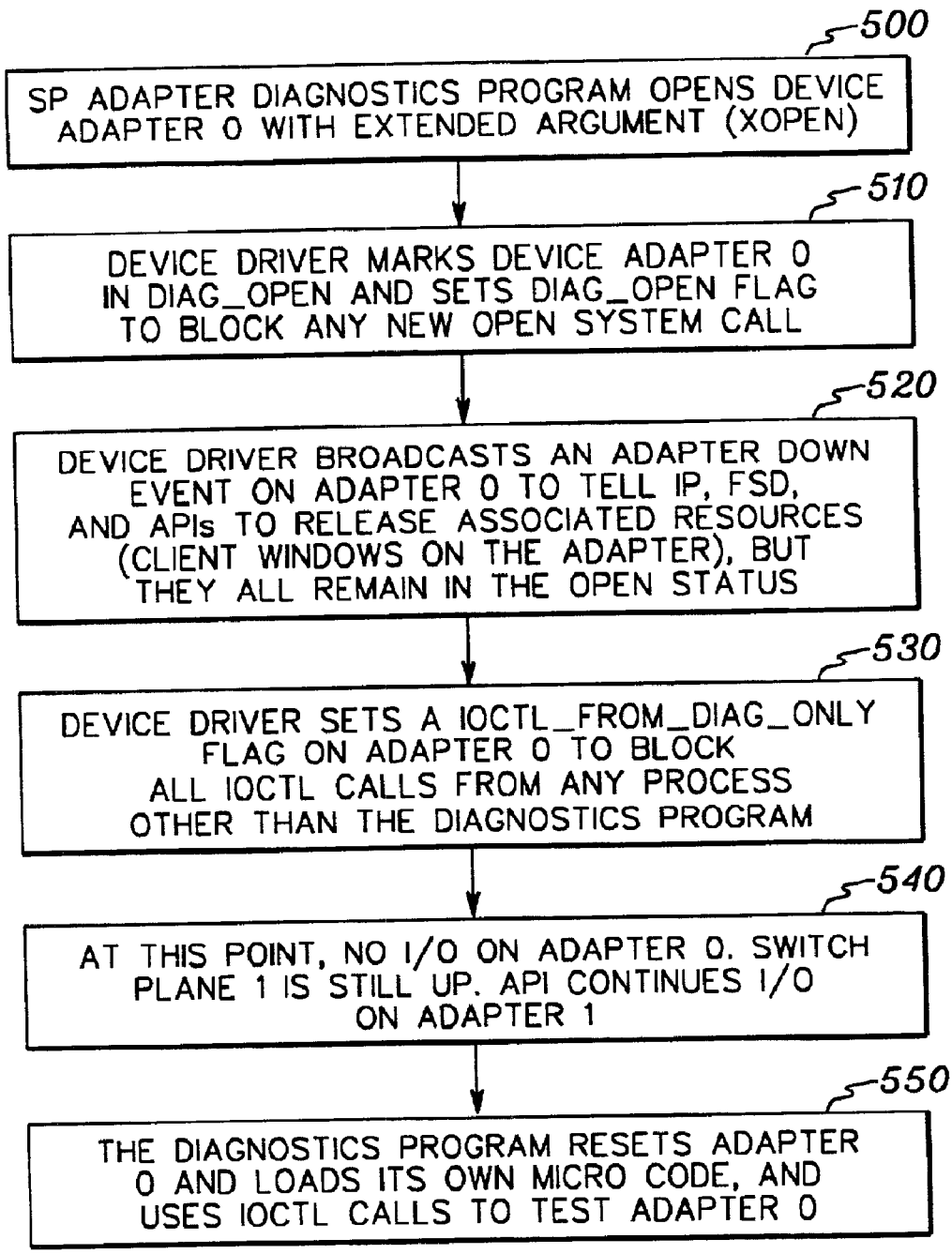
FIG. 5 is a flowchart of one embodiment of diagnostics start up processing implemented by the switch node of FIG. 3 in accordance with an aspect of the present invention.

One embodiment of release of resources and diagnostic testing in accordance with the principles of the present invention is depicted in FIG. 5. The SP adapter diagnostics program first opens a device adapter 0 with an extended argument 500. More particularly, the SP switch diagnostics program opens the switch adapter device with, for example, a UNIX "OPENX" system call to pass an "EXT" parameter to tell the adapter device that a diagnostics mode is to be initiated. The device driver then marks (for example) adapter device 0 with diag_open and sets a diag_open flag to block any new open system calls to open that adapter 510. The device driver also broadcasts an adapter down event to ask all users, including the IP component to release their resources on the adapter, i.e., windows or partitions on the adapter 520. (In accordance with this invention, all released resources can remain in open status.)

This is accomplished through a list of input/output control (ioctls) calls from the users of the windows. An adapter down request is also put on the fault service daemon's request queue. The FSD processes this request to close the service window and terminate the adapter thread. After this, the SP switch device driver sets an ioctl_from_diag_only flag to block any ioctl calls issued from any process other than the diagnostics program based on process id 530. This completes the device open routine called by the diagnostics program. From this time on all ioctl calls and send/receive requests will only be accepted from the diagnostics program. The diag_open and ioctl_from_diag_only flags are set and associated with the device adapter to be tested. When the diagnostics program is testing one adapter in a multiadapter environment, the other adapter(s) is still capable of functioning. For example, the API component continues to receive and send input/output on device adapter 1, while device adapter 0 is undergoing diagnostics testing 540. Next, the diagnostics program resets the device adapter to be tested (e.g., adapter 0), loads its own microcode to the adapter, and uses ioctl calls to test adapter 0 550.

Figure 6:
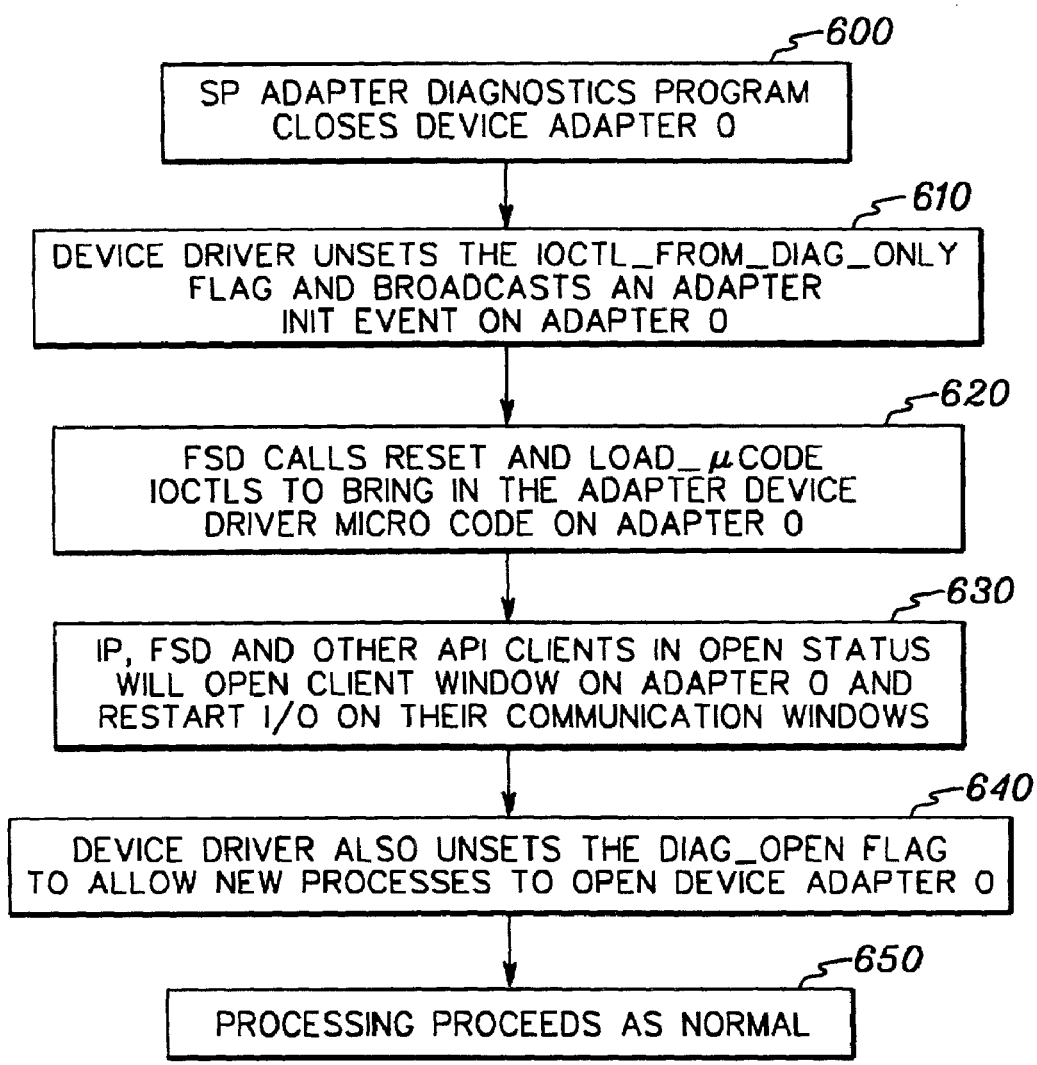
FIG. 6 is a flowchart of one embodiment of processing implemented by the switch node of FIG. 3 upon completion of diagnostics testing of one or more switch adapters.

Once testing is completed, the diagnostic program calls the device close function to close device adapter 0 600 (FIG. 6). The device driver then unsets the ioctl_from_diag_only flag and broadcasts an adapter "up" event to let the FSD, IP and other open clients reopen their client windows on the adapter 610. The FSD then calls the reset and load_µcode ioctls to bring in the adapter device driver microcode 620. IP, FSD and other API clients in open status will open client windows on the adapter and restart I/O on their communication windows 630. The device driver also unsets the diag_open flag to allow new processes to open device adapter 0 640. Thus, the adapter is back to normal processing 650.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. In a switch node, a method of releasing control of an adapter to a diagnostics program, the method comprising:
   setting a first flag by a device driver associated with the adapter to block any new open system call;
   broadcasting an adapter down event to instruct components of the switch node to release resources on the adapter; and
   setting a second flag by the device driver to block input/output control calls other than from the diagnostics program.

2. The method of claim 1, wherein the components of the switch node release resources on the adapter without closing those resources.

3. The method of claim 2, wherein the components of the switch node include one or more of an internet protocol (IP) component, a fault service daemon (FSD) component, and an application program interface (API) component.

4. The method of claim 3, wherein the resources to be released on the adapter comprise client windows on the adapter.

5. The method of claim 1, further comprising initiating the diagnostics program and opening the device driver to the diagnostics program.

6. The method of claim 1, wherein said broadcasting comprises broadcasting from the device driver the adapter down event to instruct components to release resources on the adapter.

7. The method of claim 1, wherein the first flag comprises a diag_open flag, and the second flag comprises an ioctl_from_diag_only flag.

8. The method of claim 1, wherein the adapter comprises a first adapter and the device driver further includes a second adapter, and wherein the method comprises releasing the first adapter to the diagnostics program, while the second adapter remains up and running to components of the switch node.

9. The method of claim 1, further in combination with a method of diagnostic testing of the adapter, said combination including the diagnostic program resetting the adapter, loading diagnostic microcode onto the adapter, and using ioctl calls to test the adapter.

10. The combination method of claim 9, further comprising reinitiating the adapter when diagnostics is complete, said reinitiating comprising:
  closing the diagnostics program on the device driver;
  unsetting the second flag and broadcasting an adapter initiate event;
  bringing up default device driver microcode;
  opening client windows on the adapter for any components remaining in open status, and restarting input/output on their communication windows; and
  unsetting the first flag to allow new processes to open the device driver.

11. A system of initiating diagnostics of a switch node adapter, said system comprising:
  means for setting a first flag by a device driver associated with the adapter to block any new open system call;
  means for broadcasting an adapter down event to instruct components of the switch node to release resources on the adapter; and
  means for setting a second flag by the device driver to block input/output control (ioctl) calls other than from a diagnostics program.

12. The system of claim 11, wherein the components of the switch node release resources on the adapter, without closing those resources, responsive to said means for broadcasting.

13. The system of claim 12, wherein the components of the switch node include one or more of an internet protocol (IP) component, a fault service daemon (FSD) component, and an application program interface (API) component.

14. The system of claim 13, wherein the resources to be released on the adapter comprise client windows on the adapter.

15. The system of claim 11, further comprising means for initiating the diagnostics program and for opening the device driver to the diagnostics program.

16. The system of claim 11, wherein said means for broadcasting comprises means for broadcasting from the device driver the adapter down event to instruct the components to release resources on the adapter.

17. The system of claim 11, wherein the first flag comprises a diag_open flag, and the second flag comprises an ioctl_from_diag_only flag.

18. The system of claim 11, wherein the adapter comprises a first adapter and the device driver further includes a second adapter, and wherein the system further comprises means for releasing the first adapter to the diagnostics program, while the second adapter remains up and running to components of the switch node.

19. The system of claim 11, further in combination with a system for diagnostic testing the adapter, said combination system including means for the diagnostic program to reset the adapter, to load diagnostic microcode onto the adapter, and to use ioctl calls to test the adapter.

20. The combination system of claim 19, further comprising means for reinitiating the adapter when diagnostics is complete, said means for reinitiating comprising:
  means for closing the diagnostics program on the device driver;
  means for unsetting the second flag and broadcasting an adapter initiate event;
  means for bringing up default device driver microcode;
  means for opening client windows on the adapter for any components remaining in open status, and for restarting input/output on their communication windows; and
  means for unsetting the first flag to allow new processes to open the device driver.

21. A system for facilitating diagnostics testing of a switch node adapter, said system comprising:
  a device driver having an adapter to undergo diagnostics testing, wherein upon initiation of diagnostics said device driver is adapted to:
    set a first flag associated with the adapter to block any new open system call;
    broadcast an adapter down event to instruct components of the switch node to release resources on the adapter; and
    set a second flag on the device driver to block input/output control calls other than from a diagnostics routine, thereby releasing control of the adapter to the diagnostics routine for testing.

22. At least one program storage device readable by a machine, tangibly embodying at least one program of instructions executable by the machine to perform a method of releasing control of a switch node adapter to a diagnostics program, comprising:
  setting a first flag by a device driver associated with the adapter to block any new open system call;
  broadcasting an adapter down event to instruct components of the switch node to release resources on the adapter; and
  setting a second flag by the device driver to block input/output control calls other than from the diagnostics program.

23. The at least one program storage device of claim 22, wherein the components of the switch node release resources on the adapter without closing those resources.

24. The at least one program storage device of claim 23, wherein the components of the switch node include one or more of an internet protocol (IP) component, a fault service daemon (FSD) component, and an application program interface (API) component.

25. The at least one program storage device of claim 24, wherein the resources to be released on the adapter comprise client windows on the adapter.

26. The at least one program storage device of claim 22, further comprising initiating the diagnostics program and opening the device driver to the diagnostics program.

27. The at least one program storage device of claim 22, wherein said broadcasting comprises broadcasting from the device driver the adapter down event to instruct components to release resources on the adapter.

28. The at least one program storage device of claim 22, wherein the first flag comprises a diag_open flag and the second flag comprises an ioctl_from_diag_only flag.

29. The at least one program storage device of claim 22, wherein the adapter comprises a first adapter and the device driver further includes a second adapter, and wherein the method comprises releasing the first adapter to the diagnostics program, while the second adapter remains up and running to components of the switch node.

30. The at least one program storage device of claim 22, wherein said method is further in combination with a method of diagnostic testing of the adapter, said combination method including employing the diagnostic program to reset the adapter, to load diagnostic microcode onto the adapter, and use ioctl calls to test the adapter.

31. The at least one program storage device of claim 30, further comprising reinitiating the adapter when diagnostics is complete, said reinitiating comprising:

closing the diagnostics program on the device driver;

unsetting the second flag and broadcasting an adapter initiate event;

bringing up default device driver microcode;

opening client windows on the adapter for any components remaining in open status, and restarting input/output on their communication windows; and unsetting the first flag to allow new processes to open the device driver.

* * * * *